United States Patent [19]

Thompson

[11] 4,401,103
[45] Aug. 30, 1983

[54] SOLAR ENERGY CONVERSION APPARATUS

[76] Inventor: Hugh A. Thompson, 5777 Windermere La., Fairfield, Ohio 45014

[21] Appl. No.: 144,669

[22] Filed: Apr. 28, 1980

[51] Int. Cl.³ .............................................. F24J 3/02
[52] U.S. Cl. ................................... 126/419; 126/425; 126/430; 126/435; 126/436; 126/439; 126/440; 126/445; 126/449; 353/3; 165/166; 60/641.15
[58] Field of Search ............... 126/400, 417, 418, 419, 126/424, 425, 430, 435, 436, 437, 438, 439, 440, 444, 445, 449, 443, DIG. 1; 60/641, 641.8, 641.11, 641.15; 165/485, 164, 166; 353/3; 250/203 R; 350/288, 293, 294, 299

[56] References Cited

U.S. PATENT DOCUMENTS

| | | | |
|---|---|---|---|
| 260,657 | 7/1882 | Calver | 126/438 |
| 507,999 | 11/1893 | Davis | 353/3 |
| 1,946,184 | 2/1934 | Abbot | 126/438 |
| 1,951,403 | 3/1934 | Goddard | 126/440 |
| 3,167,159 | 1/1965 | Bovenkerk | 52/173 R |
| 3,171,403 | 3/1965 | Drescher | 126/439 |
| 3,466,119 | 9/1969 | Francia | 126/438 |
| 3,823,305 | 7/1974 | Schroder | 219/365 |
| 3,905,352 | 9/1975 | Jahn | 126/438 |
| 3,934,573 | 1/1976 | Dandini | 126/440 |
| 3,982,527 | 9/1976 | Cheng et al. | 126/438 |
| 3,987,786 | 10/1976 | Keyes et al. | 126/449 |
| 3,993,041 | 11/1976 | Diggs | 126/440 |
| 4,010,731 | 3/1977 | Harrison | 126/400 |
| 4,033,118 | 7/1977 | Powell | 126/440 |
| 4,034,735 | 7/1977 | Waldrip | 126/438 |
| 4,056,313 | 11/1977 | Arbogast | 126/438 |
| 4,066,062 | 1/1978 | Houston | 126/440 |
| 4,079,591 | 3/1978 | Derby et al. | 60/641 |
| 4,103,493 | 8/1978 | Schoenfelder | 60/641 |
| 4,130,109 | 12/1978 | Brueck | 126/439 |
| 4,137,897 | 2/1979 | Moore | 126/438 |
| 4,139,286 | 2/1979 | Hein et al. | 353/3 |
| 4,220,139 | 9/1980 | Ramsden | 126/419 |

Primary Examiner—Lee E. Barrett
Attorney, Agent, or Firm—Wood, Herron & Evans

[57] ABSTRACT

Apparatus for converting solar energy to useful energy principally for home use. The apparatus provides a complete system for receiving solar energy over a large area, e.g. 1,000 square feet; concentrating the energy; and directing the energy toward a target of a few square feet at an extremely high temperature. The receiving, concentrating and transmitting apparatus consists of an array of collectors provided with mechanisms for tracking the sun. The collectors include a system of reflectors and/or lenses to first concentrate and then direct the energy toward the target.

The system further includes a substantial storage chamber with means for circulating a fluid between the target and the storage chamber to transfer heat from the target to the storage chamber. The system further includes means for transferring the heat from the target and/or storage system to a heat engine and electrical generator combination to create power for use on demand. Heat transferred to the engine cooling fluid is used for space heating and air conditioning.

13 Claims, 14 Drawing Figures

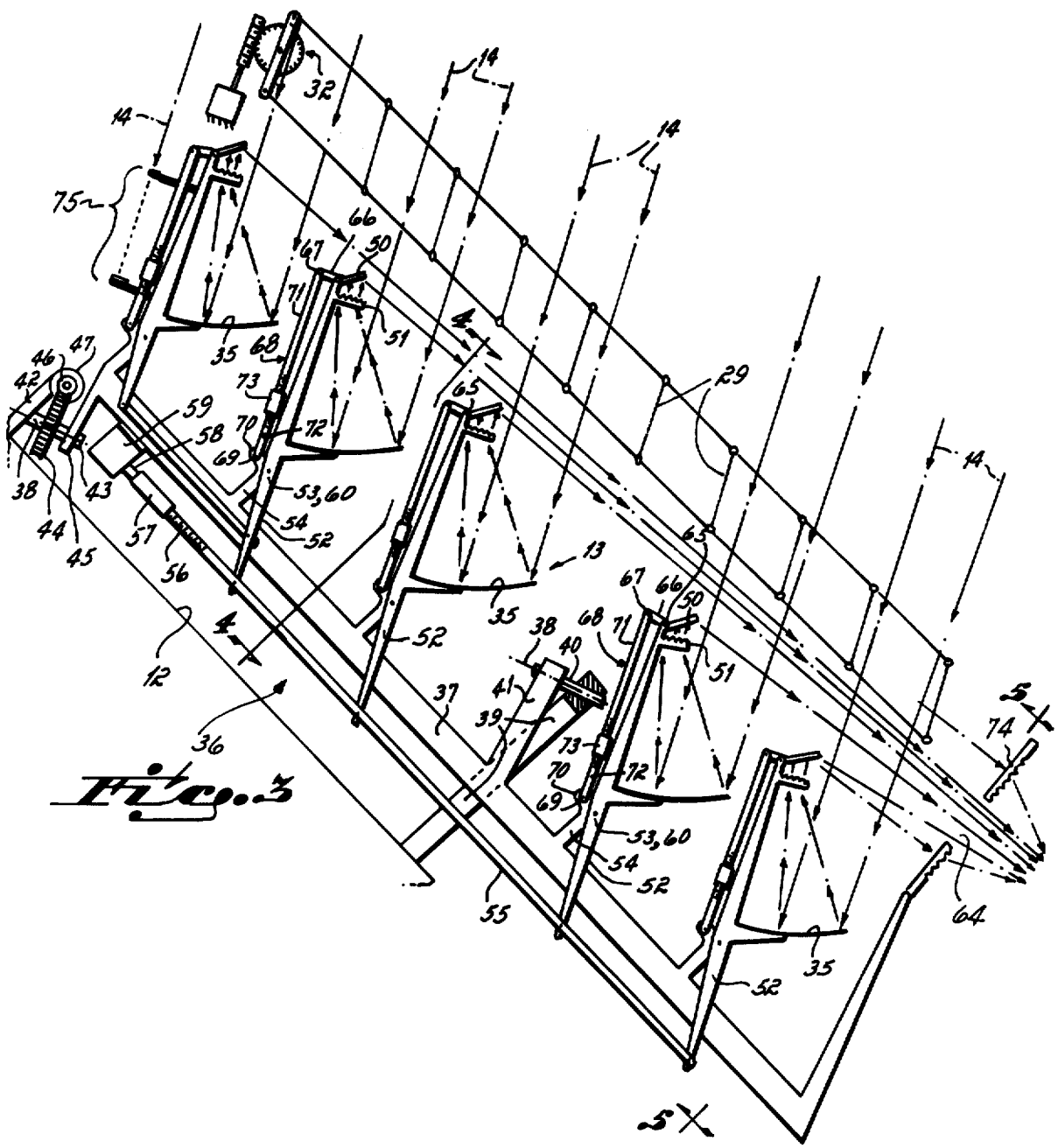

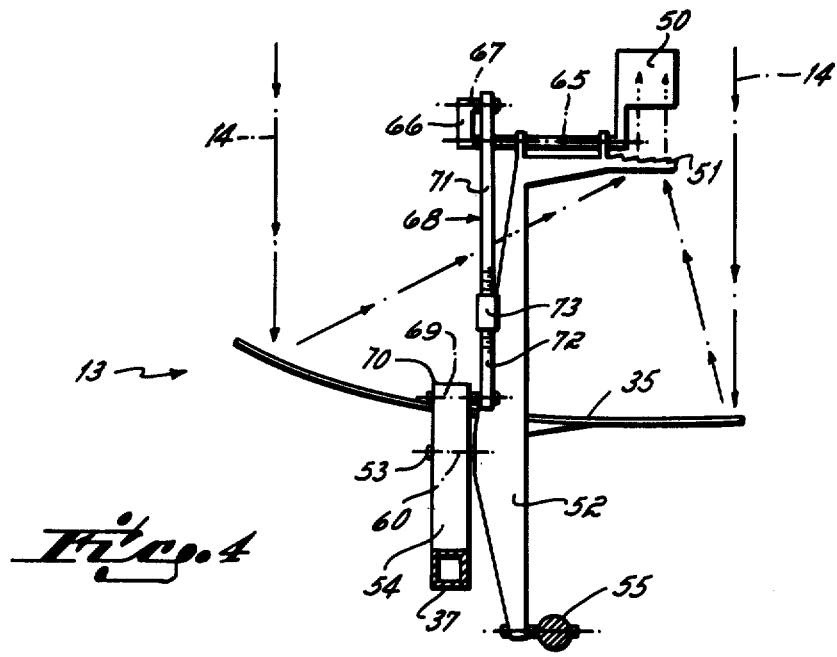
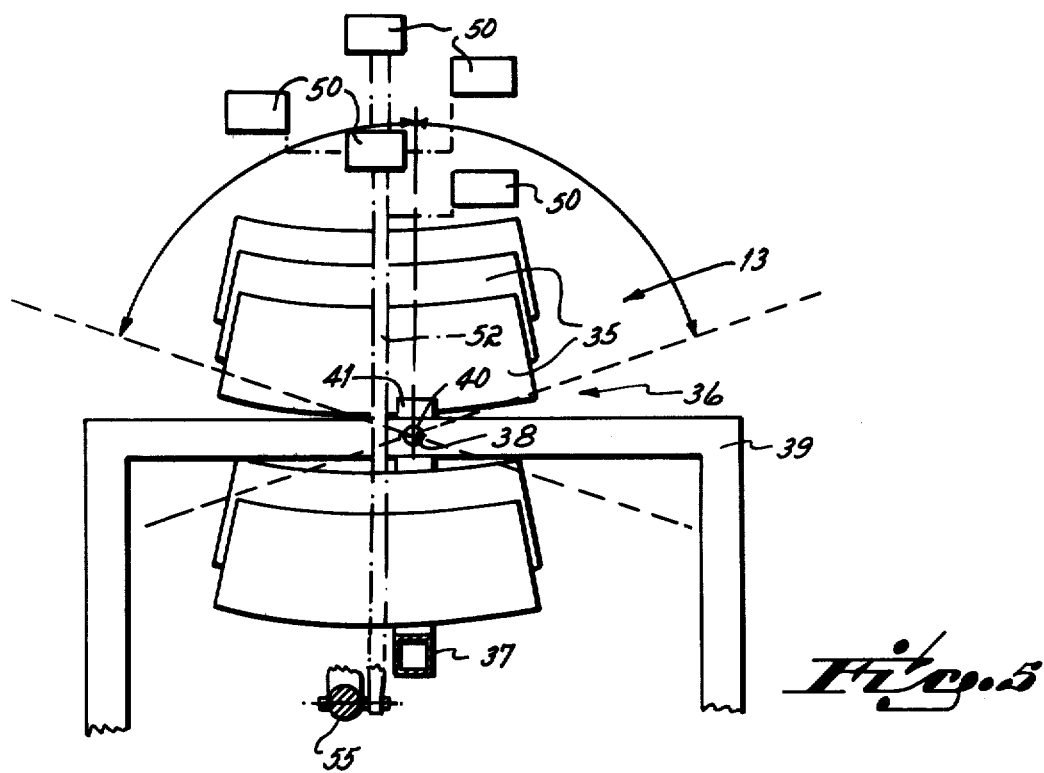

SOLAR ENERGY CONVERSION APPARATUS

This invention relates to a system for converting solar energy to useful energy and is particularly directed to a system for application to home use wherein the solar energy is collected and stored at extremely high temperatures such that the stored energy can be used to satisfy all the year-round energy requirements of the homeowner in most areas of the country.

BACKGROUND OF THE INVENTION

Much attention has been given recently to the matter of converting solar energy to a useful form so as to reduce the dependency of mankind on fossil fuels and nuclear energy. It is estimated that several thousand patents have issued in the last ten years as solutions or partial solutions to the solar energy converting problem. Two general approaches to the solar energy conversion problem seem to dominate the existing literature and practice on the subject.

In one form, collectors are provided for mounting on the ground or on the roof of a dwelling. The collectors consist of large reflectors covering a large area of the dwelling roof, the reflectors being curved to focus the sun's rays onto a tube containing a fluid to which the solar energy is transferred. The tubes of a plurality of collectors are interconnected and the fluid contained therein is directed principally to a central heating area. Provision may be made for converting some of the energy contained in the fluid to electrical energy so as to satisfy some of the energy requirements of the resident other than heat.

The system described above has a number of disadvantages. It is necessarily a low temperature system without any capability of storing significant quantities of energy for use on days when the sun is not shining. The low temperature heat is efficient only for space heating. As a consequence, it is at best only a supplement to the forms of energy currently in use and is not suitable for year-round supplying of energy.

Additionally, the requirement of transmitting the energy via fluid passage through substantial lengths of tubing is disadvantageous in that the exposure of the tubing, through insulated, to ambient temperature results in substantial heat loss. These heat losses prevent the system from attaining simultaneously the high temperature and high efficiency needed for meeting the full energy needs of the house.

Finally, the system does not easily admit of the tracking of the sun by the collectors and thus the sun's rays do not efficiently and directly impinge upon the collector system except during the limited period of time.

Another form for solar energy conversion has been called a power tower. The power towers which have been principally disclosed consist of a plurality of reflectors mounted on the ground or on terraced structures built for that purpose to cover a very sizeable area. A central target is provided and the reflectors are arranged to receive energy from the sun and direct it to the target in the tower. Usually, provision is made for driving the reflectors either individually or in groups so as to track the sun as it passes from horizon to horizon.

The power tower is a much more practical type of energy converter in the utilization of systems for tracking the sun and in the reflecting of radiant energy directly to target as contrasted to the utilization of a fluid medium as described above.

For the homeowner, the power tower has not been a feasible solution to the use of solar energy. There has been disclosed no practical way of collecting the solar energy and directing it to a target from which the heat can be extracted. For example, it is impractical to have a tower placed in the middle of the owner's property to receive the radiant energy from the collectors. No practical way has been disclosed for converting the energy received from the target to useful energy which the homeowner can use year-round.

Finally, for the power tower to be a successful energy-converting system, the radiant energy passing through the atmosphere from the collectors to the target would be of such great intensity that it would endanger the living things in the area.

An objective of the present invention has been to provide a solar energy system principally for use with a dwelling for human beings, the solar energy system providing efficient utilization of solar energy throughout the year. In most areas of the country, complete home energy needs can be provided year-round without a back-up system.

This objective is attained in part by a collector array, mountable on a roof top, with means at the collector for concentrating the impinging solar energy and transmitting it in a compact form to a nearby target. The collectors are preferably mounted on a plurality of spaced bars or carriers which are angulated in such a way as to most efficiently capture the sun's rays and direct them efficiently to the target. Means are provided for rotating the carrier bars about first axes and rotating the reflectors about second axes lying in planes perpendicular to the first axes so as to track the sun as it passes from horizon to horizon and as it moves between its highest and lowest points with respect to the horizon.

Preferably, the collector reflectors and/or lenses are mounted above the carrier bar so as to create a substantially unobstructed path of the sun's energy onto the collector system and to the target.

The collecting concentrating and transmitting system permits the disposition of a target at about ground level and quite close to the dwelling with which the system is used. Several advantages are derived from this feature. The path of the concentrated sun rays between the collector and the target can be effectively shielded so as to eliminate the possibility of living things passing through the path of those rays. The target can be located quite close to the storage room as well as other accessory elements such as electrical generating systems so that loss of heat through convection is minimized.

The several features and objectives of the invention will become more readily apparent from the following detailed description taken in conjunction with the accompanying drawings in which:

FIG. 3 is a diagrammatic, side elevational view of a group of collector units;

FIG. 4 is a cross-sectional view taken along lines 4—4 of FIG. 3 illustrating one collector unit of the group;

FIG. 5 is a cross-sectional view taken along lines 5—5 of FIG. 3 illustrating the group of collector units primarily in end elevation;

GENERAL ORGANIZATION

Figure 1:
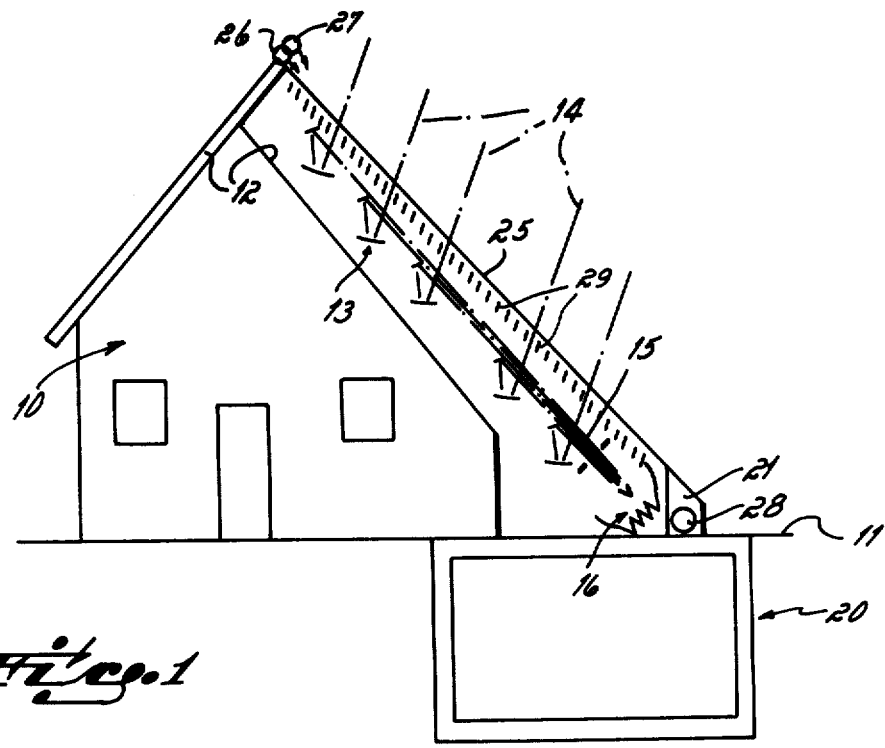
FIG. 1 is a diagrammatic elevational view taken from the west side of a dwelling.
Figure 2:
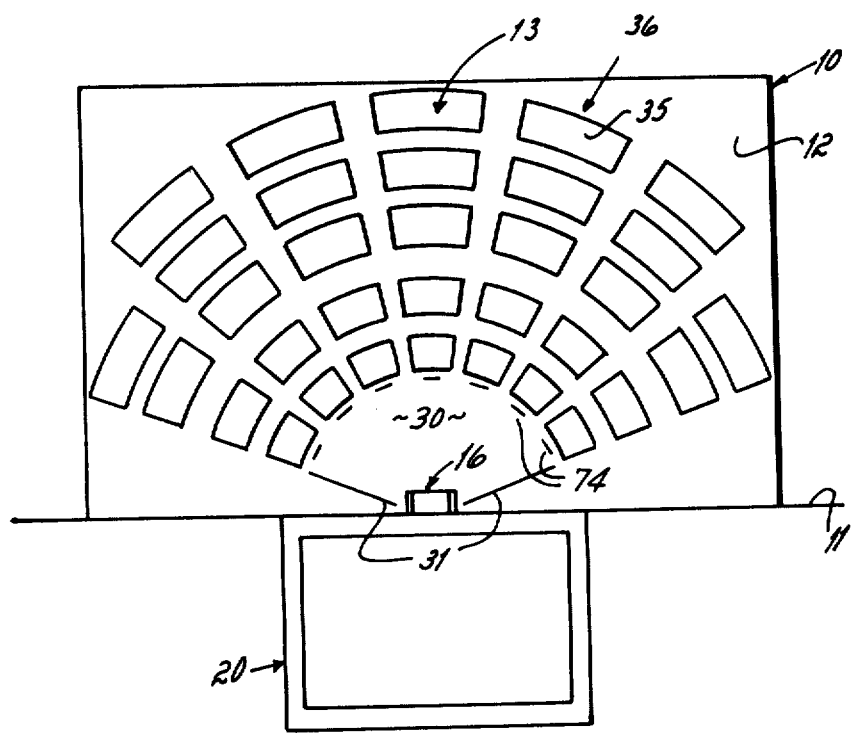
FIG. 2 is a diagrammatic elevational view partly in section taken from the south of the dwelling.

The general organization of the system of the present invention is illustrated in FIGS. 1 and 2. There, a dwelling 10 projecting above the ground 11 has a pitched roof 12. The invention could be used with a dwelling having a flat roof, but such a dwelling would require a different arrangement for the collector system, as can be seen with reference to FIGS. 13 and 14. Mounted on the roof is an array of collectors 13. Each collector in the array concentrates solar energy indicated at 14 and transmits that energy, as indicated by the arrows 15, to a target 16. The target 16 is adjacent a storage room 20 which is located below ground level. Immediately above the storage room and adjacent the target is a power room 21 which contains accessory elements such as an engine (preferably a Stirling engine) and generator combination 28 for converting the solar energy to electrical energy. On the opposite side of the target 16 a room is provided to contain power conditioning equipment, microprocessor controls and monitors, electrical storage batteries, air conditioning unit, vacuum pump, etc. which control and utilize the solar energy.

The collector array is preferably enclosed by a transparent roof 25. The transparent roof is preferably equipped with a cleaning system 26 consisting of means for discharging a stream of water across the roof to wash away particulate material which may have settled on the transparent roof between cleaning periods. A similar emergency protection system 27 may optionally be provided for discharging an opaque fluid across the transparent roof in order to block out substantially all solar energy in the event of malfunction and in order to permit emergency repairs to be made on the collector system. Alternatively and preferably, a system of louvers 29 is positioned under the transparent roof 25. Tracking means 32 (FIG. 3) are provided to maintain the plane of the louvers parallel to the sun's rays during normal operation. In emergencies the tracking means 32 will shift the louvers to a position totally blocking out the sun's rays, thereby shutting down the system.

The space 30 between the collector array 13 and the target 16 is surrounded by a shield 31 which prevents any living thing from passing through the area where highly concentrated sun's rays are transmitted to the target 16.

In the operation of the system, the incident rays of solar energy 14 impinge upon the individual collectors. The reflectors and/or lenses of the individual collectors concentrate the solar energy impinging on a wide area into a small column of energy which is directly transmitted to the target 16. The combined effect of the columns of radiant energy from the several groups of collectors which form the array is to create an extremely high temperature at the target of, for example, 1500° F. A fluid medium such as air is circulated around and through the target, which acts as a heat exchanger, so that the heat of the target created by the sun's energy is given up to the air. The air is then forced through the storage room where it transfers its heat to a storage medium such as rocks. Heat can be transmitted directly from the target to the engine/generator combination 28. Alternatively, heated air can be directed from the storage room to the target and thence to the engine/generator combination in order to generate the electricity needed to satisfy the general energy requirements in the dwelling during periods when no sun impinges on the collector array.

The heat discharged from the engine to a cooling fluid may be used for space heating the dwelling or may be used to supply energy for air conditioning equipment in the summer.

Collector System

The collector system (FIGS. 3, 4 and 5) includes a plurality of primary reflectors 35, the reflectors being mounted in groups 36 (FIG. 2) on a bar 37. As diagrammatically illustrated in FIGS. 3 to 5, the bar 37 is mounted for rotation about a tracking axis 38. A support frame 39 mounted on the roof carries a pin 40 to which an arm 41 fixed to the bar 37 is rotatably mounted. Another support frame 42 mounted on the roof adjacent the upper end of the bar 37 carries a shaft 43 which is rotatably mounted in the support frame 42. The shaft 43 has a pinion gear 44 and has fixed to it an arm 45 which is integral with the bar 37. The pinion gear 44 is engaged by a worm gear 46 which is driven by a tracking motor 47.

In the illustrated form of the invention, each collector unit includes a primary parabolic reflector 35 and a secondary flat reflector 50. Interposed between the primary and secondary reflectors is a Fresnel lens 51. The reflectors 35, 50 and lens 51 are carried on a lever 52 which is pivoted at 53 to a post 54 projecting from the carrier bar 37. A tracking link 55 extends substantially the length of the bar 37 and is threaded at 56 at its upper end. The threaded upper end 56 is received in an internally threaded sleeve 57 which is fixed to a shaft 58 of a tracking motor 59. The tracking motor 59 rotates shaft 58 causing the link 55 to extend or retract which in turn causes the lens assembly to pivot about an axis 60 (FIG. 4) at the pivot 53.

The secondary reflector 50 is pivoted at 65 to the lever 52 and has an arm 66. The arm 66 is pivotally connected at 67 to a link 68 which is pivoted at its other end at axis 69 to an extension 70 of the post 54. The link 68 is formed of two elements 71 and 72 interconnected by a threaded sleeve 73 which permits the length to be varied in order to adjust the output direction of the secondary reflector. The distance between pivot points 65 and 67 is twice that of the distance between pivot points 53 and 69. Thus, when the tracking link 55 causes the lever 52 and the primary parabolic reflector to swing through an angle, the secondary reflector will swing through half that angle with respect to the arm 52 in order to maintain the radiation from the secondary reflector directed onto the target 16.

It appears to be extremely important that there be a precise 2:1 ratio between the movement of the secondary reflector 50 and the primary reflector 35 in order to prevent an undesirable beam divergence. It would therefore be preferred to utilize a nearly parallelogram linkage driving a 2:1 gear at the secondary reflector rather than to have a pure linkage system illustrated.

As best seen in FIGS. 3 and 4, the incoming rays from the sun are parallel and impinge upon the primary parabolic reflector 35. There, the rays are converted until they strike the Fresnel lens 51. The Fresnel lens 51 converts the converging rays to parallel rays which impinge upon the secondary reflector 50 and are then directed in parallelism, as at 15, toward the target 16. The flat reflector may be given a slight curvature in order to tend to cause the rays 15 to converge slightly in order to offset any divergence due to distortion in the reflector and lens system and due to the finite size of the solar disk. As shown in FIG. 5, the secondary reflectors 50 are in staggered relationship to one another so that the lower lenses of the group do not obstruct transmission of radiant energy from the upper reflectors.

To further correct for a divergence, it is contemplated that a Fresnel lens be located immediately downstream of the collector system for the purpose of capturing stray rays and directing them toward the target 16. The Fresnel lens has an aperture 64 through which the main body of the concentrated rays pass directly toward the target 16. That aperture 64 is surrounded by the Fresnel lens portion 74 so that the diverging rays are focused into the target.

A sun locator 75, which is a commercially available device, is mounted on each group in order to detect the position of the sun and to generate signals to the tracking motor 47 of axis 38 and the tracking motor 59 of axis 60 in order to cause the primary reflectors to follow the sun and receives as directly as possible the radiant energy from the sun. The axes 38, 60 are perpendicular to each other but not necessarily in the same plane. As viewed in FIG. 2, for the central group of reflectors, the rotation of the carrier bar about the axis 38 (azimuth tracking) primarily causes the collector group to follow the sun as it moves from the east horizon to the west horizon. The pivoting of the levers 52 about the axis 60 (elevation tracking) causes the individual collector units to follow the sun in an elevational track as the sun moves between its lowest and highest positions with respect to the horizon. For the outboard group of reflectors, the tracking east to west and low to high is shared by the rotation with respect to both axes. In either event, it is the combined motions which keep the primary reflector directed at the sun all day.

In general, the collection system is of lightweight design, since there are no forces on it other than its own weight. Foamed and reinforced plastics can be extensively used.

Target

The overall function of receiver or target 16 is to convert concentrated radiation into sensible heat; send that to the heat engine or to storage or both; send stored heat to the engine when there is no sun; and to do these at good thermal efficiency without significant moving parts.

Figure 7:
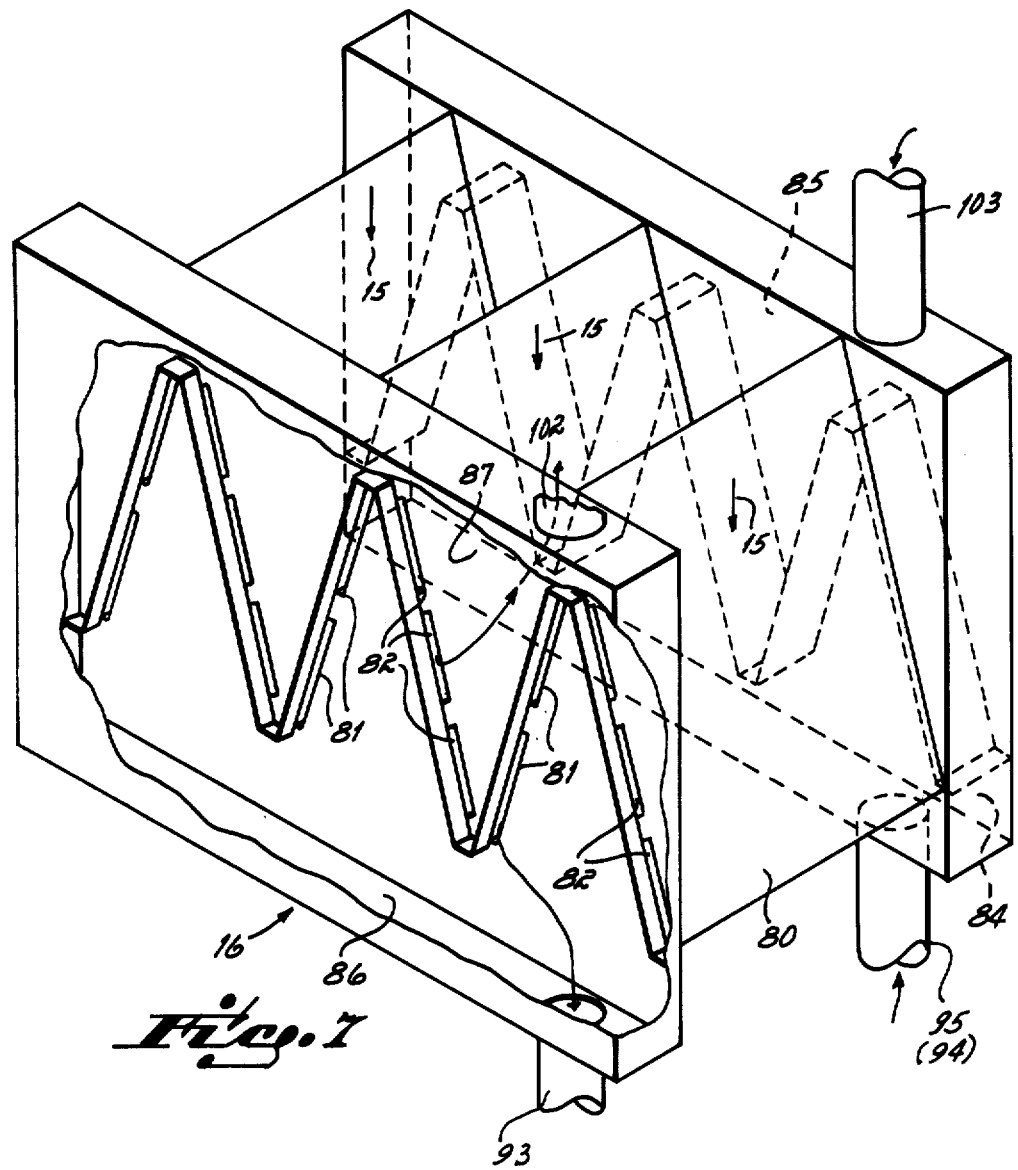
FIG. 7 is a diagrammatic perspective view with portions broken away illustrating the target.
Figure 8:
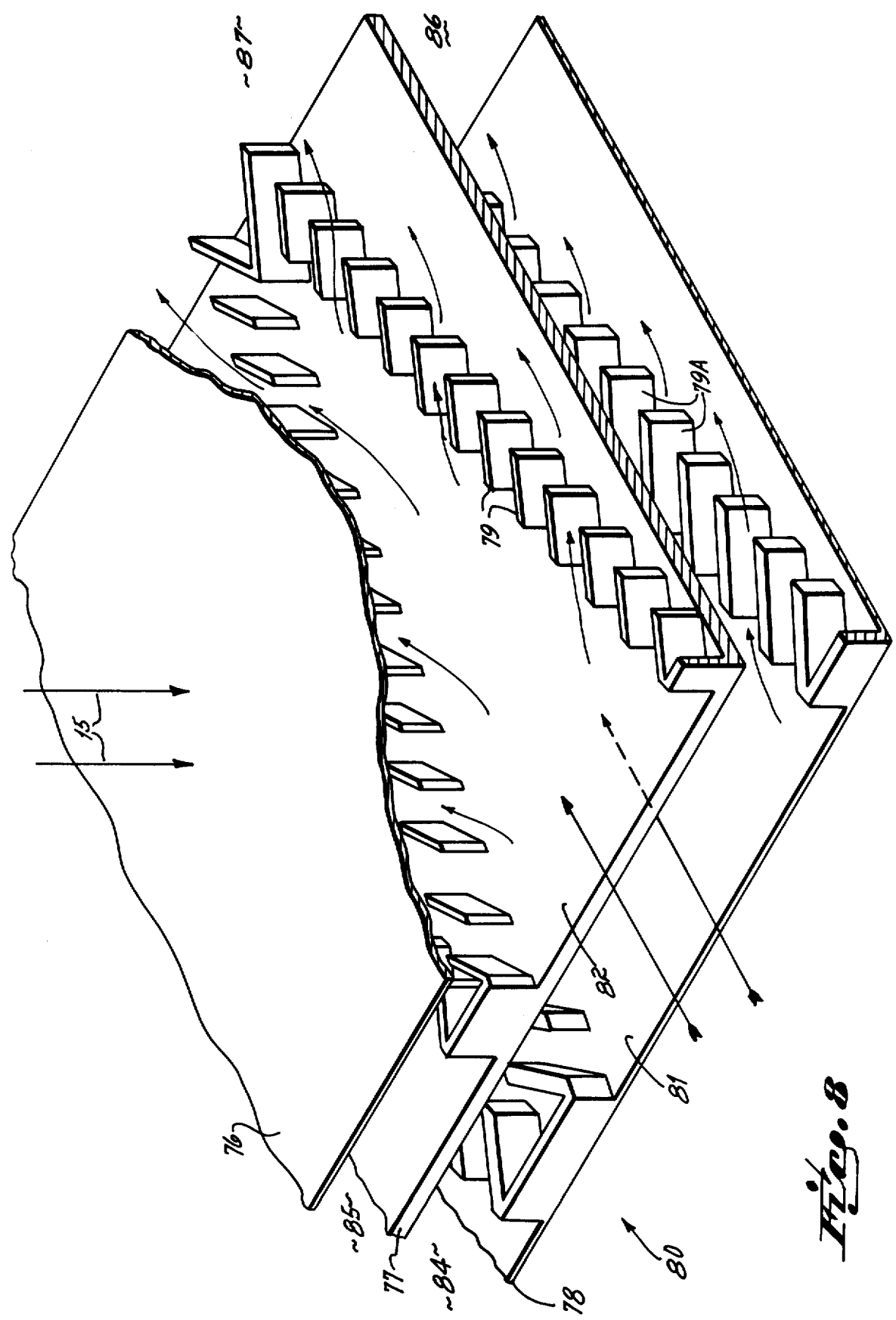
FIG. 8 is a disassembled perspective view partly broken away illustrating a target element.

In the form of the invention illustrated in FIGS. 7 and 8, the target consists of a series of flat heat exchangers 80 which are interconnected in a zigzag form as illustrated in FIG. 7. Each heat exchanger has two sets of slots 81, 82. As viewed in FIG. 7, the slots 81 in the downward-facing portions of the heat exchanger 80 are connected to the circulation system for storage, as will be described in more detail below. The slots 82 in the upwardly-facing portions of the heat exchanger are connected to accept the working fluid of the heat engine, also to be described in greater detail below. The slots for the storage system are of substantially larger size and greater volume than the slots for the Stirling engine system. Since the latter form part of the working volume of the engine, engine efficiency is enhanced by low volume. On the storage side this constraint is absent, and somewhat larger slots are desirable to avoid clogging from particlates.

Each group of slots has its own inlet header (84, 85) and outlet header (86, 87), the headers 84, 86 being provided for the storage circulation system and the headers 85, 87 for the engine and generator circulation system. The heat exchangers may be formed from copper, stainless steel, ceramic, graphite or composite materials.

The orientation of the target is such that the concentrated radiation 15 impinges on the plates at acute angles to the surface of the plates. The zigzag form gives a low frontal area for low heat losses (re-radiation and convection) while giving large fin area.

As illustrated in FIG. 8, each heat exchanger plate is formed as a sandwich of an upper plate 76, a middle plate 77 and a lower plate 78 with good thermal conduct being maintained among all plates. The space between the plates 76 and 77 carry fins 79 in comparatively spaced relation, the fins 79 forming a V at a relatively acute angle. The low volume fluid passing around the fins 79 through the space between the plates 76 and 77 is directed to the Stirling engine.

Similarly, between the plates 77 and 78 are fins 79A, the fins 79A forming a V at a larger angle than that formed by the fins 79. These fins 79A receive the air, at high volume, passing through the space between the plates 77 and 78. The fins 79 and 79A should be integral with both adjacent plates between which they are secured. The fluid passing through that space picks up the heat created at the target and delivers it to storage during the time that the sun is shining on the system. At other times, the fluid conveys heat from storage to the target, giving up heat to the target which is in turn picked up by the fluid passing through the alternate space between plates 76, 77 which is directed to the Stirling engine.

Storage Room (Heat Storage System)

Figure 6:
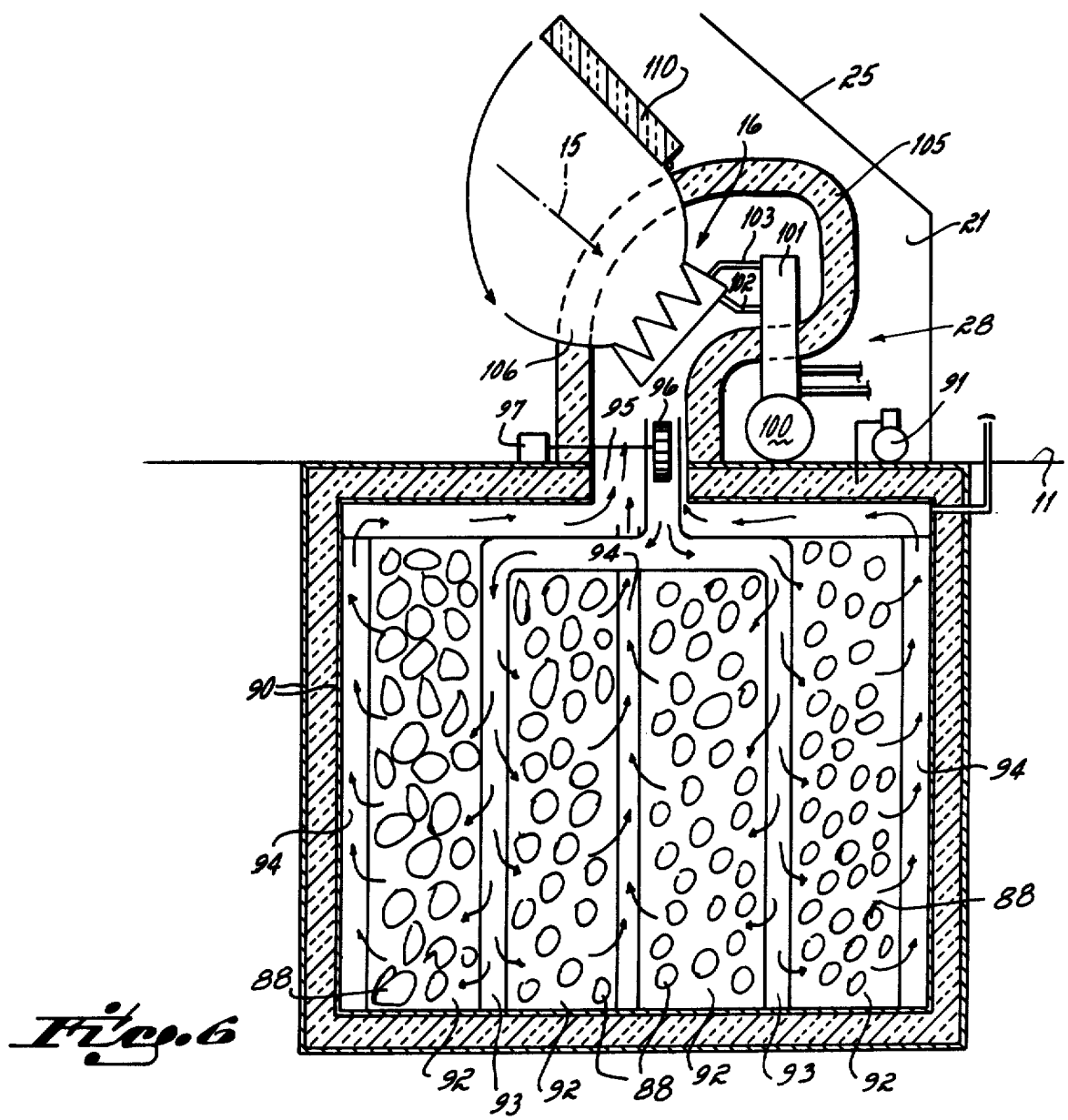
FIG. 6 is a diagrammatic cross-sectional view of the portion of the system which includes the target and the storage system.

A typical storage room is illustrated in FIG. 6. The storage room is preferably located immediately adjacent the target 16 so that the system will incur minimal heat losses due to transmission of heat from the target to the storage room. A blower 96 having a motor 97 is provided to force the circulation of air between the target and the store room. Air is preferred for simplicity, but other high temperature fluids are not precluded. Note that this air is never cold. Typically it would pick up heat at perhaps 1550° F. and deliver it to a body already at 1500° F. The storage room is totally enclosed by walls 90 of insulative material. If possible, the walls should consist of dual walls having space in between with provision for evacuating the walls by means of a vacuum pump 91, as indicated.

Contained within the storage room are multiple compartments 92 containing a thermal media 88 in the form of bricks, rocks, or other material which can absorb sensible or latent heat. Inlet passageways 93 are provided for the flow of heated air from the target into the storage room. The passageways are perforated so as to permit flow of the air from the passageways 93 into the compartments 92. Return passageways 94 are also provided. Return passageways are also perforated so as to permit the air, after it has given up its heat to the thermal medium, that is, the rocks, to pass into the return passageways 94. The air returned from the storage room through the passageways 94 would pass through a passageway 95 into the inlet header 84 to the target 16 where additional heat is picked up from the target.

The same air circulation occurs for heat withdrawal from storage, except then the target 16 is slightly cooler and picks up heat.

The passageways to the headers 84, 85, 86, 87 are not illustrated in FIG. 6. It should be understood that the passageway 94 is connected to the inlet header 84 and the passageways 93 are connected to the outlet header 86 of the target 16.

In the power room an engine, preferably a Stirling engine 100, is connected to a generator 101 to make up the engine/generator combination 28. The engine/generator combination is connected by way of an inlet passageway 102 to the discharge header 87 of the target 16 and air is returned to the target 16 by way of passageway 103 connected to the inlet header 85 of the target 16.

Other means for utilizing the heat of the solar energy to drive an engine connected to a generator in order to generate the usable voltage would be well within the skill of the art. So also would non-heat-engine methods of electricity generation, such as photovoltaic, thermionic, and thermoelectric devices. Heat engines are preferred, however. Cascaded types, e.g., heat engine plus thermoelectric, are also practical. Insulation 105 including a pivoted cover 110 surrounds most of the target except for the opening 106 through which the collected sun's rays pass. The pivoted cover is preferably provided with automatic controls for opening and closing it during periods when solar energy is available and unavailable, respectively. The insulation also surrounds the hot end of the Stirling engine. The opening 106 may be covered by a window to inhibit heat losses by convection and re-radiation when the cover 110 is open.

Operation

On any sunny day, the sun locator 75 will control the motors 47 and 59 of each group of collectors to rotate the bar 37 and to reciprocate the link 55 in order to aim the primary reflectors with respect to the sun so that they most efficiently capture the heat of the sun's radiations. Each primary reflector 35 causes the sun's rays to converge and to pass through a Fresnel lens associated with it. The parallel rays emanating from the Fresnel lens are then reflected from a flat mirror directly to the target 16 in a very concentrated form. Because the reflector and lens system is located above the carrier bar 37, there is only minimal obstruction and interference with the sun's rays impinging upon the array of collectors.

The combined effect of the array of collectors directing sunlight to the target 16 is to raise the temperature of the target 16 to approximately 1550° F. and to deliver approximately 0.6 million Btu during an average winter day to the target. When the sun has passed below the western horizon, or when clouds appear, the cover 110 is closed over the target by photoelectric control means so as to minimize the escape of heat from the target, engine, storage room and the like. The energy absorbed by the target 16 is picked up by the air which continually flows through the first set of slots 81 carrying the heat away from the target. The thus heated air passing through the storage room gives up the heat to the thermal media 88. High temperature heat from the system, that is, from the storage room or from the target itself, is used principally for driving the engine which in turn drives the generator to create electrical energy. Low temperature heat carried from the engine by a cooling medium through a heat exchanger system, not shown, is used for space heating or for absorption-type air conditioning. In operation it is preferred that the target 16 be kept hot at all times so that the Stirling engine has heat for operation on demand.

During the spring months, the heat delivered to the store room is in excess of that which would be required for normal daily usage. At the end of the spring, the storage room should normally have approximately twenty-five days of stored heat for use without sunshine.

During summer and fall, the excess heat may be used to generate surplus electricity for sale to a utility network.

Figure 10:
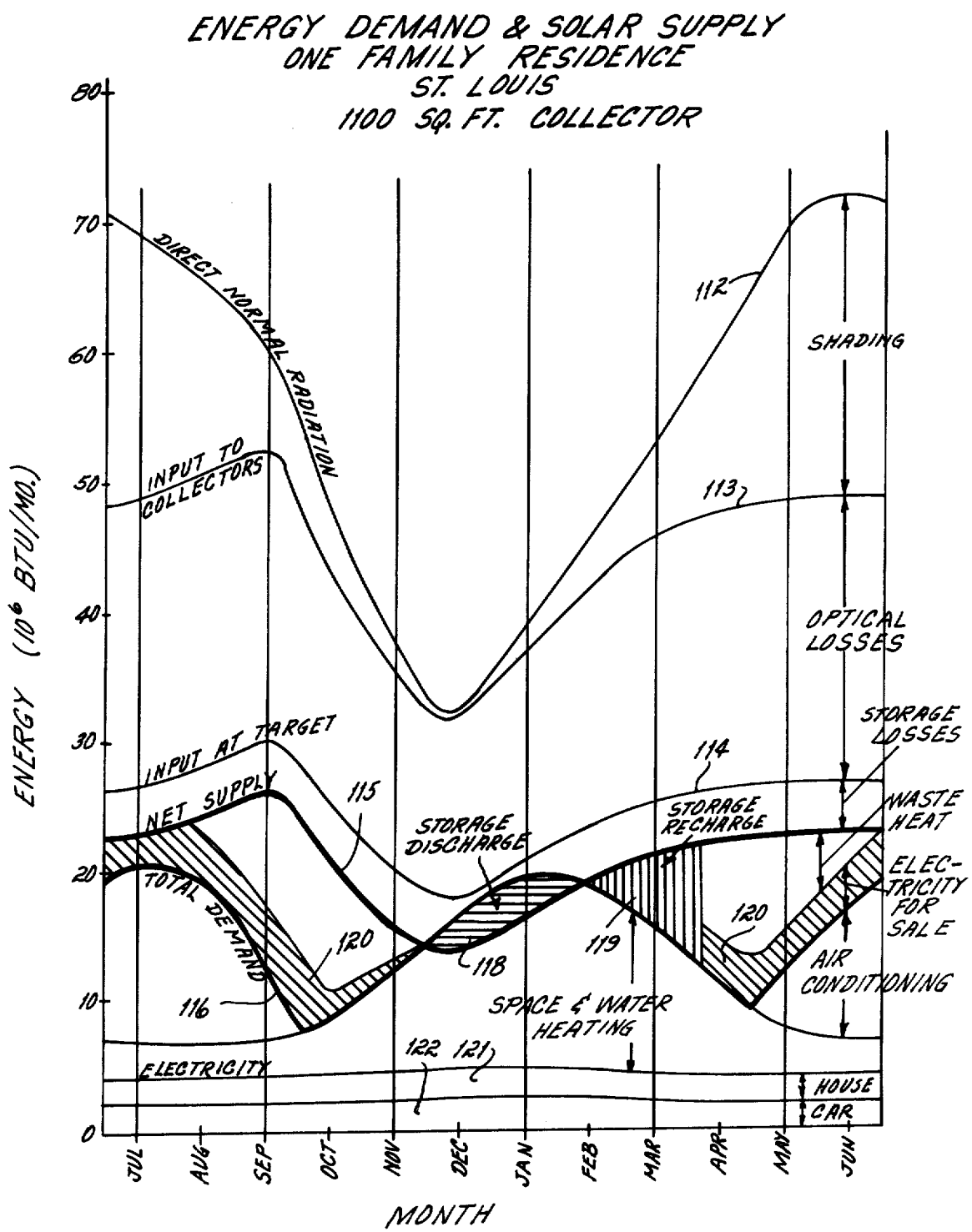
FIG. 10 is a graphic display of the manner in which the total energy received is broken up into losses, energy used and the like over a twelve month period.

The curves of FIG. 10 illustrate generally the energy which would be available during different parts of the year. By way of example, the energy available in a typical year in St. Louis, Mo. is depicted. It is assumed that a single family residence has a 1100 sq. foot collector to receive the solar energy.

The uppermost curve 112 depicts the Btu emanating from the sun which, if unshaded, would impinge upon the collector. The curve 113 depicts the energy actually impinging on the collectors. The space between the curves 112 and 113 illustrate average losses arising out of shading by adjacent collectors.

The curve 114 depicts the energy received at the target 16. The space between the curves 113 and 114 represents the energy lost due to the optical system involved.

The curve 115 depicts the actual energy available for work. The space between the curves 114 and 115 indicates the losses in the system which are primarily storage losses.

The curve 116 illustrates the total demand. It can be seen that the total demand is higher in the winter and summer months due to the need for greater heating and cooling. For most of the year, the net supply (curve 115) is greater than the total demand (curve 116).

Around December through February, the demand will be normally greater than the supply. A section 118 which is cross hatched is indicative of a discharge from storage in order to supply the energy requirement. It should be observed that that energy in the cross hatched area 118 is considerably less than the excess between supply and demand in the other areas and hence there should always be a comfortable amount of energy in storage available for use when the demand exceeds the daily supply.

The area cross hatched at 119, where supply is greater than demand, indicates storage recharge. When sufficient energy is in storage, the remaining energy received which is in excess of demand generates electricity which can be sold to local utilities. That electrical energy is indicated at 120.

Included below the total demand curve is energy used for space and water heating, the electricity normally used in the home as depicted by the block 121 and energy needed to operate an electric vehicle indicated in the block 122.

Figure 9:
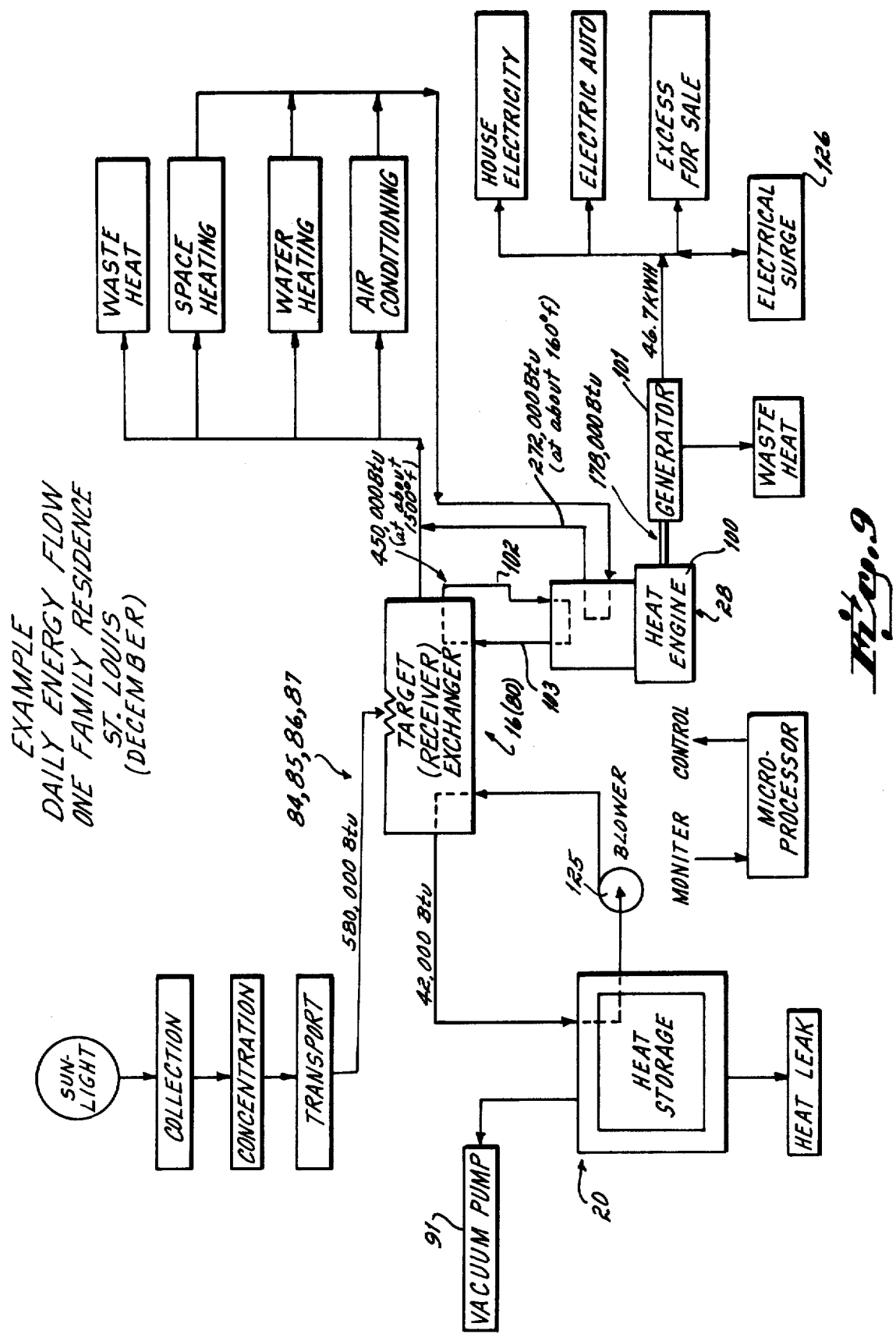
FIG. 9 is a flow sheet of the solar energy conversion system.

The chart of FIG. 9 illustrates the manner in which the energy is received from the sun and converted to useful power in the system depicted in FIGS. 1–8.

On a typical day, the sunlight, with losses in the collection, concentration and transportation from the collector to the receiver, delivers 580,000 Btu to the target 16. Of that, 42,000 Btu might be sent to storage. The air carrying the energy is circulated by a blower 125.

450,000 Btu are directed to the heat engine 28 driving the generator to create electricity for home use, an electric automobile and any excess for sale. A battery bank indicated at 126 is available for surges beyond the capacity of the generator.

It is contemplated that air would be circulated to the cool side of the heat engine and that would deliver 272,000 Btu for air conditioning, water heating, space heating and the like.

In the event excess heat is developed at the cool side of the heat engine and which cannot be otherwise used, it could be dissipated through a water system on the shaded side of the roof.

ALTERNATIVE EMBODIMENTS

Figure 11:
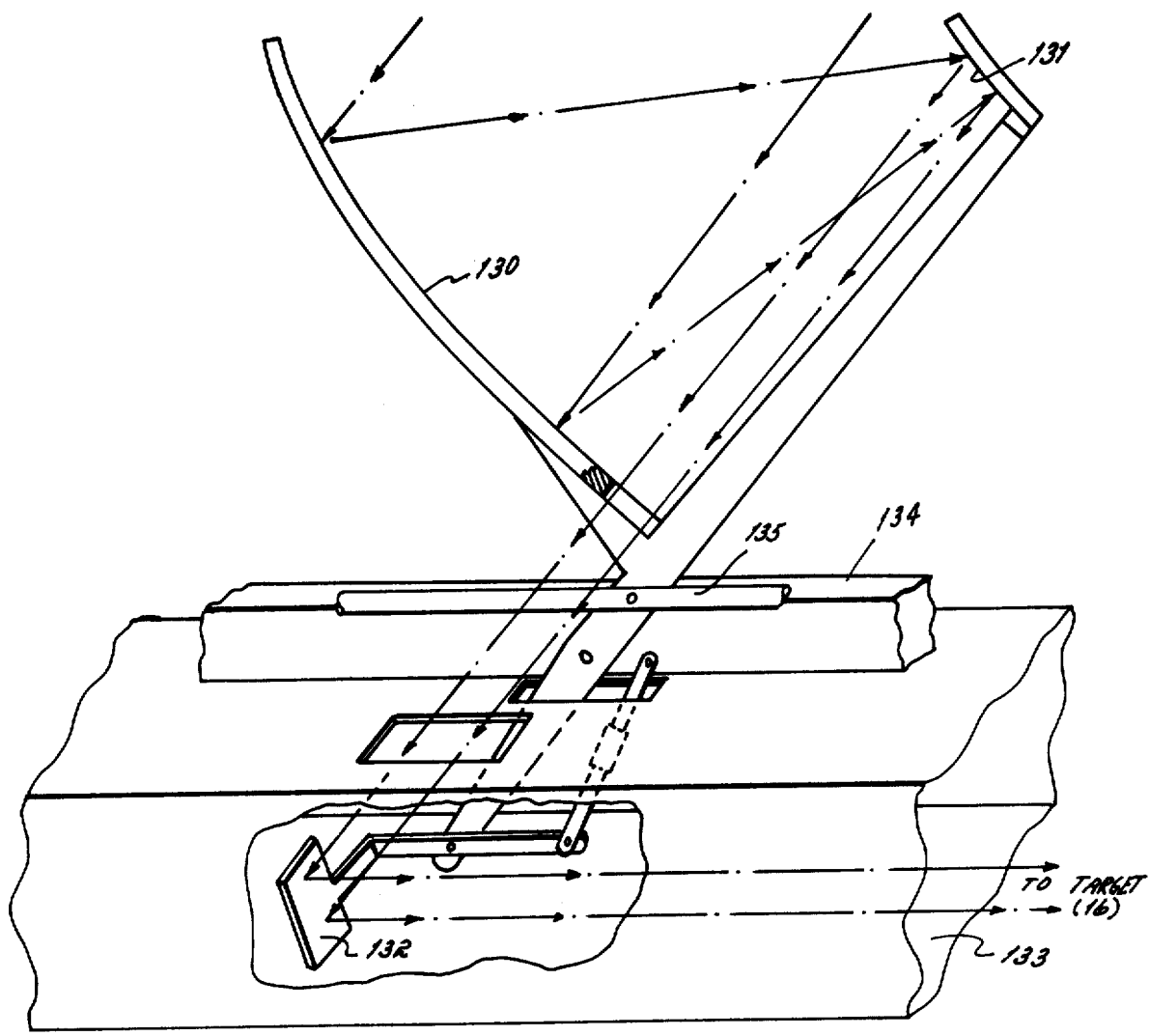
FIG. 11 is a diagrammatic perspective view of an alternative collector system.

FIG. 11 illustrates an alternative optical system. It includes a primary reflector 130 which receives the sun's rays directly. The primary reflector concentrates that energy and reflects it onto a secondary reflector 131. Generally parallel rays from the secondary reflector are directed to a tertiary reflector 132 located within a housing 133. A suitable carrier 134 for a plurality of the reflectors just described is provided and a tracking link 135 is provided to enable the reflector system to follow the sun as previously described. In this embodiment, the sun's rays are directed to the target 16 generally below the reflector system as contrasted to the original embodiment. The path of the rays to the target 16 is through a protective housing 133.

In the previous embodiments, groups of collector systems have been ganged together on a common carrier bar, such as bar 134, and the reflectors track the sun in unison through the rotation of the carrier system for the reflectors.

Figure 12:
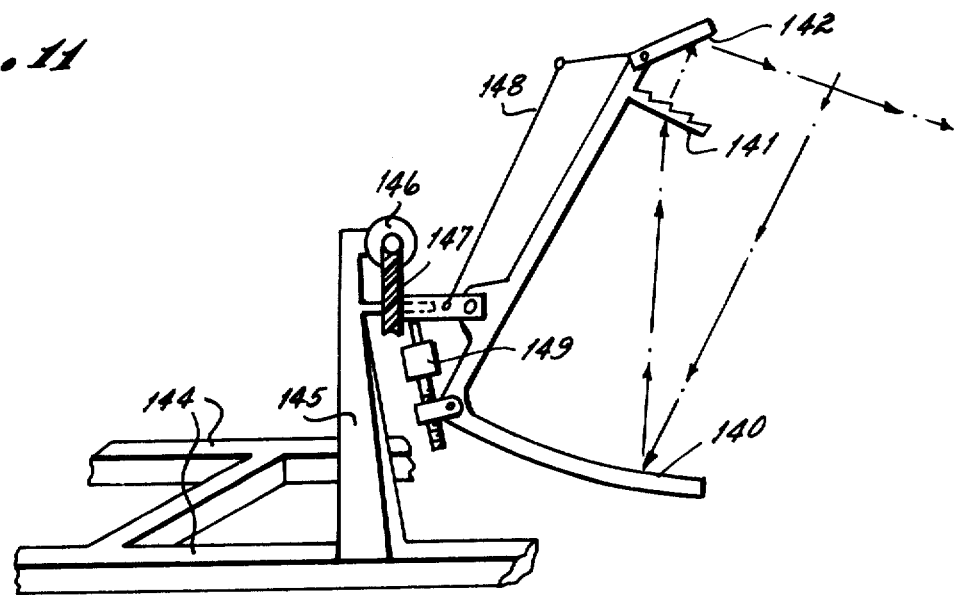
FIG. 12 is a diagrammatic perspective view of an alternative collector and tracking system.

In the embodiment of FIG. 12, a system is diagrammatically illustrated in which units are provided with independent tracking means. A primary reflector 140 directs incoming rays through a Fresnel lens 141 to a secondary reflector 142 and thence to target 16. This reflector system is mounted, along with as many other reflector systems as are required, on a frame 144 by means of a bracket 145. The bracket carries a motor 146 operating through a gear train 147 and rotates the reflector system to follow the sun from horizon to horizon.

A motor 149 is connected to the primary reflector and a linkage system 148 is provided to cause the reflector system to track the sun from its lowest to its highest points on the horizon.

A wide variety of reflector systems can also be created without departing from the scope of the present invention which has as a primary concept a collector system in which the energy is concentrated by the reflectors and directed in a concentrated form to a target.

The previous embodiments have contemplated a solar energy system for a single dwelling, the system being located on the pitched roof of the dwelling.

Figure 13:
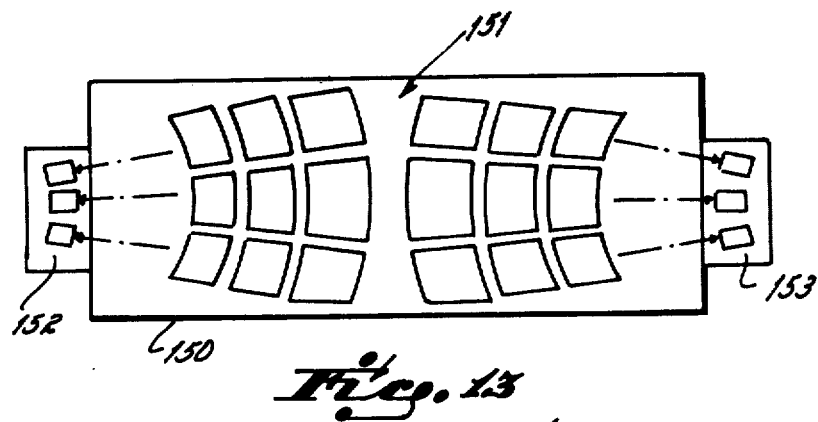
FIG. 13 is a diagrammatic top plan view of an alternative layout for a solar energy system for a larger establishment.
Figure 14:
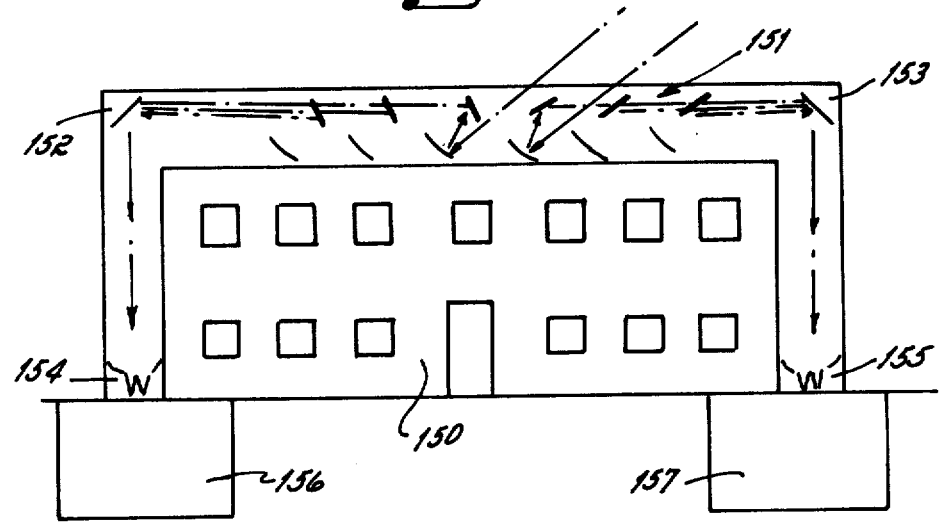
FIG. 14 is a diagrammatic elevational view, partly in section, of the establishment of FIG. 13.

Alternative systems for different types of buildings are within the scope of the present invention. One such alternative system is depicted in FIGS. 13 and 14. There, a large building, perhaps an industrial building, is indicated at 150.

The flat roof of the building has two sets of reflector systems 151, the reflector systems being oriented to direct a concentrated beam toward reflectors 152 and 153 at the corners of the building. At the base of each end of the building a target 154 and 155 is located, each target being associated with other equipment of the type previously described, including a storage area 156, 157.

In addition to the configuration thus far described, it should be understood that the collector systems would not have to be mounted on the roof of the building for which they are designed. Rather, they could be mounted on the ground. However, since the system of the present invention is primarily for use in heating single family residences, in some situation the mounting of a collector system of the order of 1,000 sq. feet on the ground also would require extra shielding to prevent inadvertent contact by living things.

I claim:

1. A solar energy conversion system comprising,
   a target,
   an elongated bar substantially longitudinally aligned with said target, means for rotating said bar about a first axis pointed at said target,
   a plurality of longitudinally spaced collector units mounted on said bar, means to rotate each said unit about a second axis which is generally perpendicular to said first axis,
   each said collector unit having a first receiving element causing the sun's rays to converge, a second element adjacent said first element for receiving said converging rays and forming a narrow beam of substantially parallel rays, a third element adjacent said second element for directing said beam to said target, and means for moving said third element relative to said first element.

2. A conversion system as in claim 1 further comprising,
   lens means between said collector units and said target to further concentrate said energy before it impinges on said target.

3. The system as in claim 1 further comprising,
   a transparent housing overlying said plurality of collector units to protect them from particulate matter in the atmosphere, and
   means for cleaning the dust from said housing.

4. The system as in claim 1 further comprising,
   a louvered screen covering said collector units for temporarily shutting said system down, and
   means for normally maintaining said louvers parallel to the sun's rays.

5. A solar energy conversion system for a dwelling having a roof, the system comprising,
   a small target for receiving concentrated solar energy and located close to said dwelling,
   an array of individual collector units mounted on the roof of said dwelling, said collector unit being mounted on a plurality of bars, said bars being mounted on said roof in spaced relation to each other, means for rotating said bars about one axis and means for rotating said collector units about a second axis to track the sun, each collector unit comprising,
- a support lever pivoted to said bar for movement about said second axis,
- a primary reflector mounted on said lever and a secondary reflector pivotally mounted on said lever for movement about an axis parallel to said second axis,
- means for rotating said secondary reflector at one-half the speed of said primary reflector,
- said primary reflector receiving energy from the sun and transmitting it via said second reflector to said target.

6. A solar energy conversion system for a dwelling having a roof, the system comprising,
- a small target for receiving concentrated solar energy and located close to said dwelling,
- a storage system close to said target for receiving and storing heat transmitted from said target in the form of a hot fluid, said target including means for converting radiant energy impinging on said target to a hot fluid,
- means for directing said fluid to said storage system, said fluid giving up its heat to said storage system,
- an array of individual collector units mounted on the roof of said dwelling, said collector units being mounted on a plurality of bars, said bars being mounted on said roof in spaced relation to each other, means for rotating said bars about one axis and means for rotating said collector units about a second axis to track the sun,
- each collector unit comprising,
  - a support lever pivoted to said bar for movement about said second axis,
  - a primary reflector mounted on said lever and a secondary reflector pivotally mounted on said lever for movement about an axis parallel to said second axis,
  - means for rotating said secondary reflector at one-half the speed of said primary reflector,
  - said primary reflector receiving energy from the sun and transmitting it via said second reflector to said target.

7. A solar energy conversion system as in claim 6 in which said primary reflector is parabolic and of substantial dimension so that the array of reflector units collectively receive a substantial amount of energy,
- a Fresnel lens interposed between said primary and secondary reflector,
- said secondary reflector being generally flat and substantially smaller than said primary reflector.

8. A solar energy conversion system for a dwelling having a roof, the system comprising,
- a small target for receiving concentrated solar energy and located close to said dwelling,
- a storage system close to said target for receiving and storing heat transmitted from said target in the form of a hot fluid,
- said target including means for converting radiant energy impinging on said target to a hot fluid, means for directing said fluid to said storage system, said fluid giving up its heat to said storage system,
- an array of individual collector units mounted on the roof of said dwelling,
- each collector unit having a first receiving element causing the sun's rays to converge, a second element adjacent said first element for receiving said converging rays and forming a narrow beam of substantially parallel rays, a third element adjacent said second element for directing said beam to said target, and means for moving said third element relative to said first element,
- means for rotating each said collector unit individually about two axes perpendicular to each other to track the sun as it moves substantially from horizon to horizon,
- a louvered screen covering said collector array for temporarily shutting said system down, and means for normally maintaining said louvers parallel to the sun's rays.

9. A solar energy conversion system for a dwelling having a roof, the system comprising,
- a small target for receiving concentrated solar energy and located close to said dwelling,
- a storage system close to said target for receiving and storing heat transmitted from said target in the form of a hot fluid,
- said target including means for converting radiant energy impinging on said target to a hot fluid, means for directing said fluid to said storage system, said fluid giving up its heat to said storage system,
- said target comprising,
  - a housing which presents a large surface area for impingement of said concentrated energy,
  - two separate passageways in said housing, and
  - inlet and outlet headers for each said passageway,
- an array of individual collector units mounted on the roof of said dwelling,
- each collector unit having a first receiving element causing the sun's rays to converge, a second element adjacent said primary element for receiving said converging rays and forming a narrow beam of substantially parallel rays, a third element adjacent said second element for directing said beam to said target, and means for moving said third element relative to said first element,
- means for rotating each said collector unit individually about two axes perpendicular to each other to track the sun as it moves substantially from horizon to horizon,
- a heat engine and electrical generator,
- means connecting one of said passageways to said heat engine to circulate fluid from said passageways to said engine,
- and means connecting the other of said passageways to said storage system to circulate fluid from said passageway to said storage system.

10. The system as in claim 9 in which said engine has a hot side to which air from said target is directed to drive said engine, and a cool side from which waste heat is exhausted,
- means connecting said cool side to apparatus in said dwelling for utilizing said waste heat for space heating and the like.

11. A solar energy conversion system for a dwelling having a roof, the system comprising,
- a small target for receiving concentrated solar energy and located close to said dwelling,
- a storage system close to said target for receiving and storing heat transmitted from said target in the form of a hot fluid, said target including means for converting radiant energy impinging on said target to a hot fluid, means for directing said fluid to said storage system, said fluid giving up its heat to said storage system, a housing consisting of a sandwich of three spaced parallel plates having a zigzag configuration to create two passageways in the spaces between said plates, fins in said passageways connected to said plates, and inlet and outlet headers for said passageways, an array of individual collector units mounted on the roof of said dwelling, each collector unit having a first receiving element causing the sun's rays to converge, a second element adjacent said first element for receiving said converging rays and forming a narrow beam of substantially parallel rays, a third element adjacent said second element for directing said beam to said target, and means for moving said third element relative to said first element, means for rotating each said collector unit individually about two axes perpendicular to each other to track the sun as it moves substantially from horizon to horizon.

12. A solar energy conversion system comprising, a target, an elongated bar substantially longitudinally aligned with said target, means for rotating said bar about a first axis pointed at said target, a plurality of longitudinally spaced collector units mounted on said bar, means to rotate each said unit about a second axis which is generally perpendicular to said first axis, each said collector unit having a first receiving element causing the sun's rays to converge, a second element adjacent said first element for receiving said converging rays and forming a narrow beam of substantially parallel rays, a third element adjacent said second element for directing said beam to said target, and means for moving said third element relative to said first element, a shield surrounding the path of said concentrated energy from said collector units to said target.

13. A solar energy conversion system for a dwelling having a roof, the system comprising, a small target for receiving concentrated solar energy and located close to said dwelling, an array of individual collector units mounted on the roof of said dwelling, said collector units being mounted on a plurality of bars, said bars being mounted on said roof in spaced relation to each other, means for rotating said bars about one axis and means for rotating said collector units about a second axis to track the sun, each collector unit comprising, a support lever pivoted to said bar for movement about said second axis, a primary reflector mounted on said lever and a secondary reflector pivotally mounted on said lever for movement about an axis parallel to said second axis, means for rotating said secondary reflector at one-half the speed of said primary reflector, said primary reflector receiving energy from the sun and transmitting it via said secondary reflector to said target, a transparent roof overlying said array of collector units to protect them from particulate matter in the atmosphere, and means for cleaning said particulate matter from said transparent roof.

* * * * *